Sept. 20, 1966  F. M. THOMSON, JR  3,273,864
SOLIDS BLENDING APPARATUS
Filed March 9, 1965  3 Sheets-Sheet 1
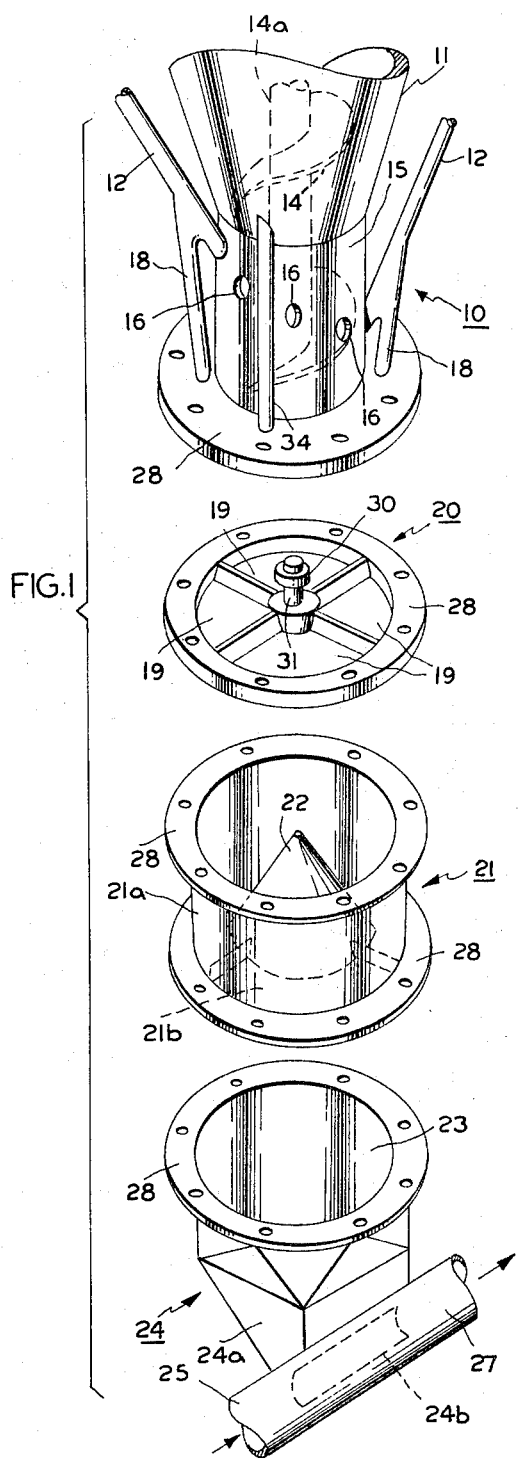
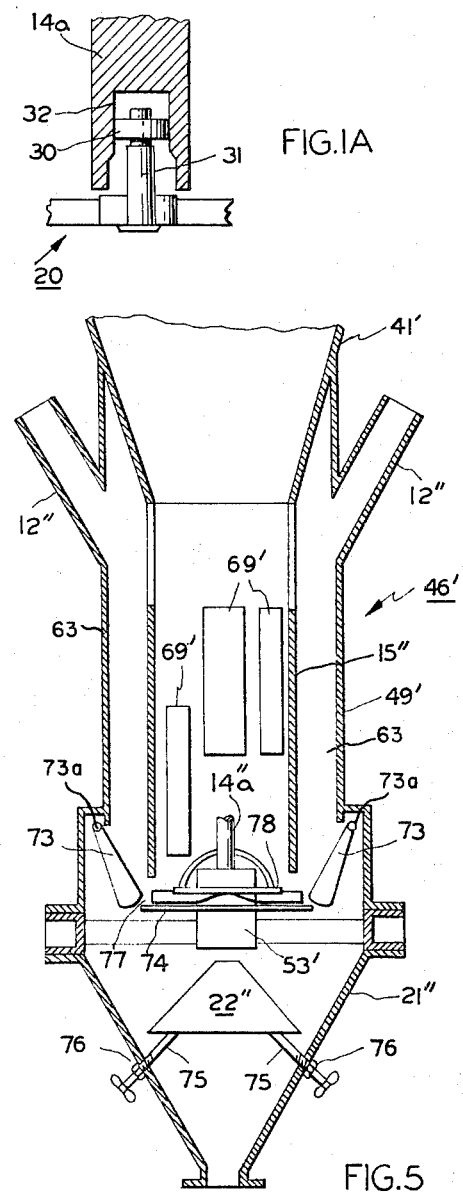
INVENTOR
FREDERICK M. THOMSON, JR.
BY  *Harry J. McCauley*
ATTORNEY Sept. 20, 1966  F. M. THOMSON, JR  3,273,864
SOLIDS BLENDING APPARATUS
Filed March 9, 1965  3 Sheets-Sheet 3

INVENTOR
FREDERICK M. THOMSON, JR.

BY Harry J. McCauley

ATTORNEY

United States Patent Office 3,273,864
Patented Sept. 20, 1966

3,273,864
SOLIDS BLENDING APPARATUS
Frederick M. Thomson, Jr., Wilmington, Del., assignor to E. I. du Pont de Nemours and Company, Wilmington, Del., a corporation of Delaware
Filed Mar. 9, 1965, Ser. No. 438,276
6 Claims. (Cl. 259—97)

This invention relates to a solids return and unloading apparatus for a solids blender, and particularly to such an apparatus adapted to service as an auxiliary for a solids blender provided with gravity-flow solids draw-offs and a co-axially disposed recycling screw conveyor.

A solids blender of design combining gravimetric solids flow from a mass of solids which it is desired to blend with screw conveyor, or equivalent, recycle return of the withdrawn solids for one or more additional passes through the apparatus is disclosed in U.S. patent application S.N. 438,275, filed of even date herewith. The solids return and unloading apparatus of this invention is especially useful in conjunction with the combination gravimetric-screw conveyor design of solids blender, and is accordingly described with particular reference thereto.

Solids blending is an operation very often essential to the general equalization of product characteristics of materials produced by batch methods, such as polymers, pigmented granules or where relatively small amounts of additives are to be distributed widely and evenly throughout large masses of particulate substances, to mention but a few examples. Gravimetric solids blending according to Reissue Patent 25,687, particularly as modified by application S.N. 438,275, supra, has proved to be very effective and economical. The objectives of this invention are to expand the advantages thereof by permitting great flexibility in blended product delivery, controlled concurrent recycling in accompaniment with product delivery, and the rapid removal of the entire blender contents in order to simplify cleaning of the blender and avoidance of contamination of one product with another where the blender is employed sequentially for different product operations. Other objectives of this invention are to provide a compact apparatus of simple construction and relatively low first cost for the purposes described.

Figure 2:
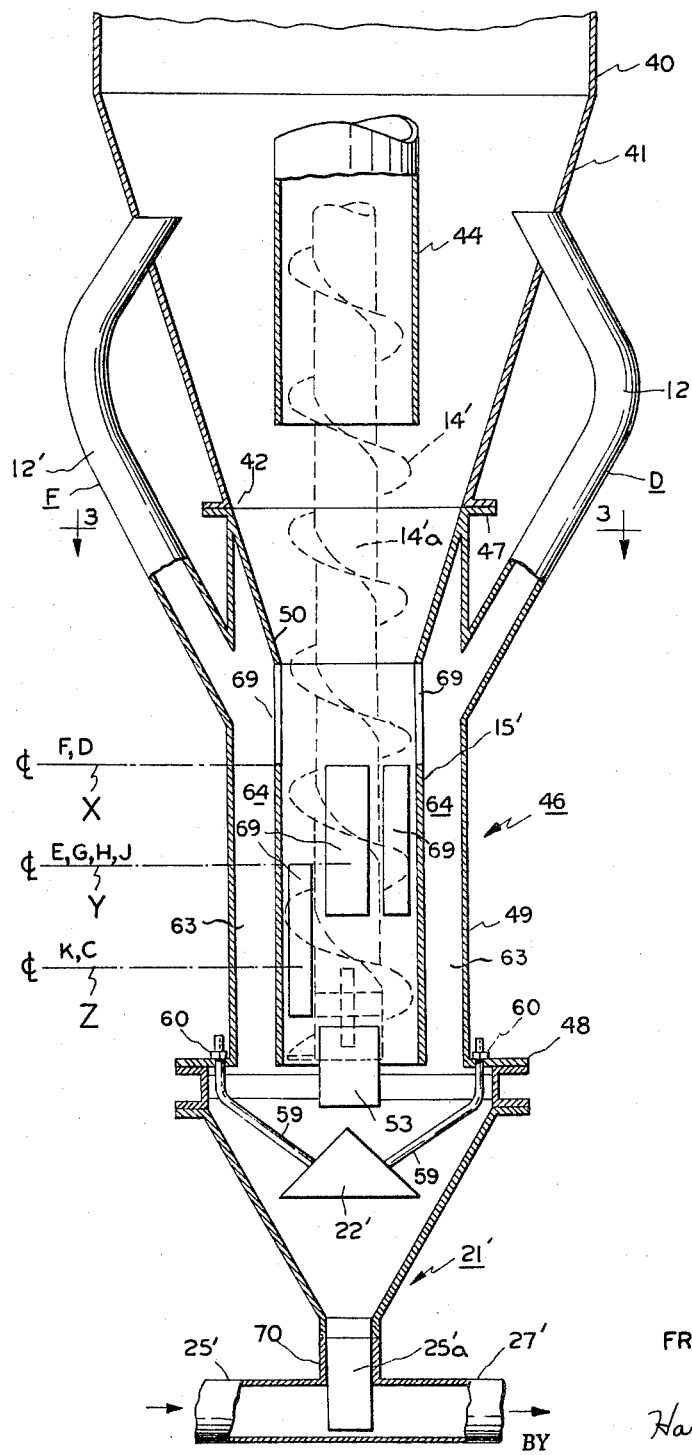
Figure 3:
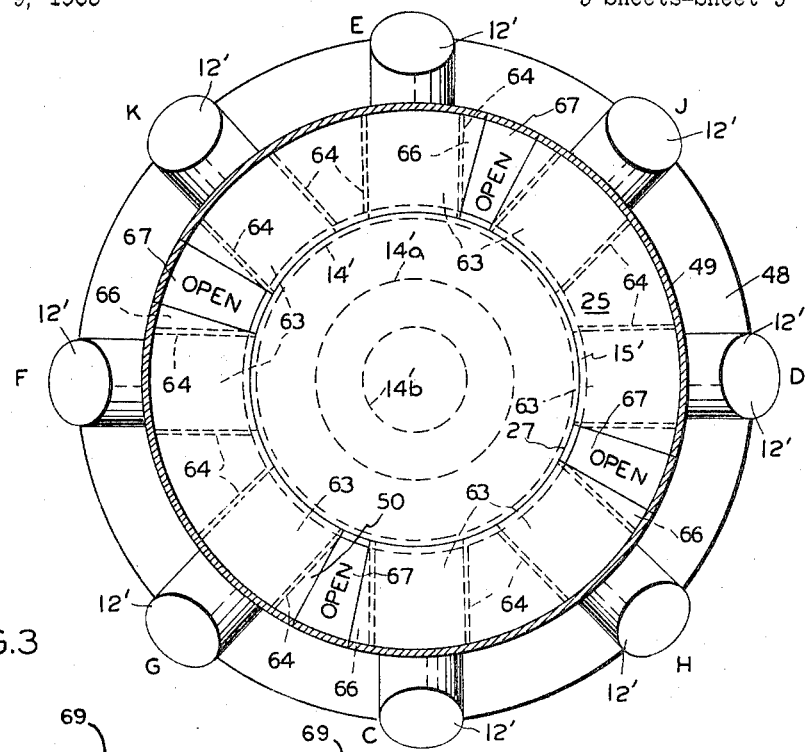
Figure 4:
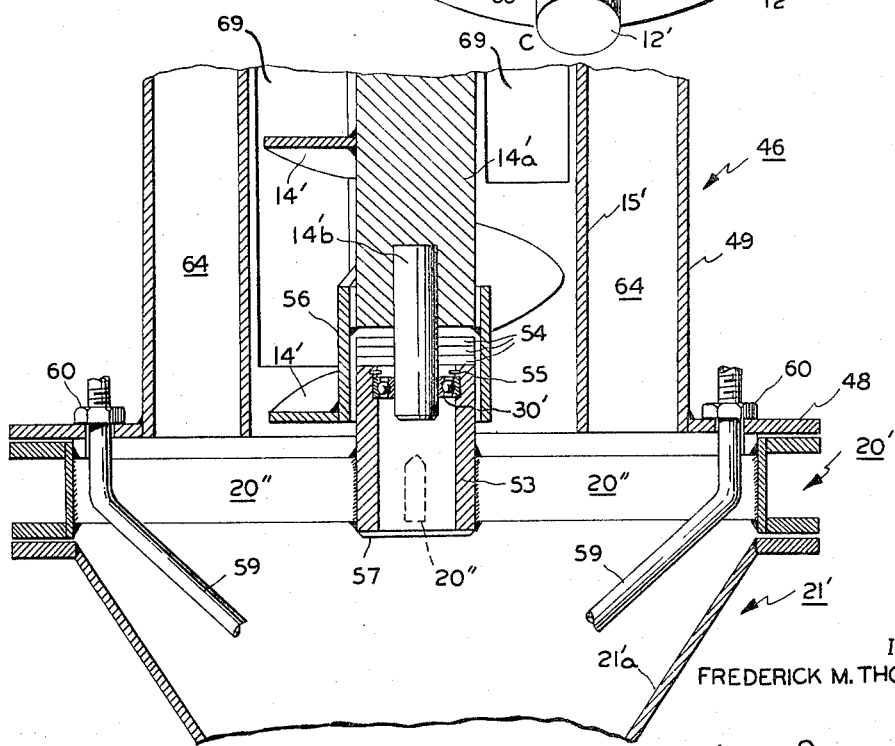

The manner in which these objectives are attained will become apparent from the detailed description and the following drawings, in which:

FIG. 1 is a perspective side elevational view of one embodiment of this invention shown in exploded view relationship with respect to a stabilizer bearing-spider subassembly, a flow equalizer, and pneumatic product transport auxiliaries adapted to employment therewith, the return connection of only two draw-offs being detailed but the location of the solids throughput openings for three other draw-offs being indicated, FIG. 1A is a fragmentary side elevation sectional detail view of the stabilizer bearing of FIG. 1 in relationship to the bottom end of the conveyor screw shaft with which it co-operates, FIG. 2 is a side elevational sectional view of another embodiment of apparatus according to this invention shown in association with the lower end of a combined gravimetric-screw conveyor recycle design of solids blender, FIG. 3 is a section taken on line 3—3, FIG. 2, FIG. 4 is a fragmentary side elevational sectional view of the apparatus of FIGS. 2 and 3 showing the details of bearing construction of the lower end of the recycling conveyor screw, and FIG. 5 is a partially schematic side elevational sectional view of a modification of the apparatus of FIGS. 2-4, with conveyor screw omitted, incorporating solids flow control means at the solids discharge end of the apparatus.

Generally, this invention constitutes a solids return and unloading apparatus for a solids blender having a vessel for the retention of solids to be blended, a co-axially disposed screw conveyor for solids recycle and a plurality of principal gravity-flow solids draw-offs opening into the periphery of the vessel proportioned to deliver substantially equal volumes of solids to be blended from said vessel during a given interval of time comprising, in combination, a tubular conduit enclosing the lower material input end of the screw conveyor at close clearance and defining therewith a receiver for solids to be recycled, solids throughput openings cut through the wall of the tubular conduit in open communication with individual ones of the lower ends of the principal gravity-flow solids draw-offs, individual extension gravity-flow solids draw-offs connected in open communication with the lower ends of the principal gravity-flow solids draw-offs disposed substantially co-parallel with the axis of the conveyor screw, and solids discharge means in open communication with the lower ends of the extension gravity-flow solids draw-offs.

Referring to FIGS. 1 and 1A particularly, one embodiment of solids return and unloading apparatus according to this invention is denoted generally at 10, shown in assembled relationship with the bottom cone outlet 11 of a gravimetric solids blender embodying screw conveyor recycle constructed according to U.S. patent application S.N. 438,275, supra. The blender incorporates a plurality of principal gravity-flow solids draw-offs 12 with intakes opening into the periphery of the blender vessel, not shown, proportioned to deliver substantially equal volumes of solids to be blended from the vessel during a given time interval. The recycle-accomplishing screw conveyor 14, power driven from the upper end, is extended at the lower end, which is housed within a tubular conduit 15 enclosing the material input length of the conveyor at close clearance and defining therewith a receiver for solids to be recycled. Return of the solids into conduit 15 is effected via a plurality of solids throughput openings 16 distributed peripherally of conduit 15 and preferably spotted lengthwise thereof to reserve particular regions of screw 14 to the reception of solids delivered by individual downcomers 12, so that a balanced recycle return of the solids co-axially up through the blending vessel is effected.

Each principal gravity-flow solids draw-off 12 is provided with an extension gravity-flow solids draw-off 18 in open communication therewith. Extension draw-offs 18 are all disposed substantially co-parallel with the axis of screw conveyor 14 and empty collectively through the quadrant spaces 19 of spider 20 and thence into the top of the solids flow equalizer auxiliary denoted generally at 21. The solids flow equalizer detailed is of the design taught in U.S. patent application S.N. 320,704, now Patent No. 3,208,737, embodying a frusto-conical baffle 22 spaced peripherally from the inside of the co-operating housing 21a so as to impede the flow of solids over the full periphery of the baffle and thereby equalize the flow throughput from apparatus 10. Discharge out of flow equalizer 21 is via the open bottom 21b, which connects with the solids entry port 23 of pneumatic conveyor funnel 24.

Funnel 24 incorporates an offset discharge spout, 24a which opens into the side of air supply pipe 25 via opening 24b. This construction insures that pipe 25 is never clogged with solids, which, instead, accumulate in static equilibrium as a small pile with substantial free space overhead allowing unimpeded transit of entrainment air from left to right, so that the solids are delivered at will through line 27 in prolongation with pipe 25 whenever air pressure is applied to pipe 25.

As can be seen in FIG. 1, all units are provided with flanges 28 drilled at mating points to accept bolts attaching the members one to another in a common assembly.

It is usually desirable to provide a stabilizer bearing for the lower end of the screw conveyor shaft 14a, particularly where this shaft is of substantial length as, typically, 20 ft. or longer. Spider 20 is provided as a support for such a bearing 30, which is journaled on the outer end of upstanding stud 31, fixed to the central spider hub, so that the bearing rotatable outer race is loosely received within blind bore 32 machined in the end of shaft 14a. Accordingly, shaft 14a, during its power-driven rotation, is stabilized against excessive eccentric rotation by biasing against the periphery of the outer race of bearing 30. Also, bore 32 shields the solids product in process from contact with bearing 30, and from any lubricant adulteration from this source.

In operation, solids withdrawn in gravity flow from preselected regions of the blending vessel, as taught in Reissue Patent 25,687, issue from the discharge ends of principal solids draw-offs 12, from whence they can be recycled by return flow through solids throughput openings 16, or withdrawn from the apparatus as product by flow through extension solids draw-offs 18. Recycle and product withdrawal can be accomplished completely independent of one another, so that concurrent or sequential conduct of one with respect to the other is optionally achieved.

Thus, recycle occurs when screw conveyor 14 is operated in solids lifting direction, under which circumstances the screw elevates material out of conduit 15 and the empty space in the conveyor flight then fills with replacement solids drawn in from openings 16. Product withdrawal can be accomplished at will by supply of conveying air through pipe 25. When no air is supplied, a pile of solids collects in the bottom of funnel 24 and all space thereabove, including the interiors of extension draw-offs 18 is filled with a static bed of solids, a condition customarily referred to as "flooded." Thus, further product withdrawal is barred, until conveying air introduced via pipe 25 disturbs the equilibrium.

Complete independence of recycle and product withdrawal is highly advantageous since, in many instances, the demand for blended material is intermittent and completely unrelated to the necessity for blending. A typical situation can be where blended product is required at unpredictable times by a plurality of polymer extrusion machines, the hoppers of which have relatively small capacity, so that blended product is delivered in small increments to one or another as demanded. At the same time, a new batch of polymer is in manufacture and, when the reactor is to be dumped, a relatively large amount of solids is discharged into the upper part of the blender as replacement for solids previously utilized by the extrusion machines. Obviously, blending with extensive recycle is now imperative, which is accomplished by operating screw conveyor 14 for a period sufficient to turn over the blender contents, typically, three times. After this, power to the conveyor is cut off and the apparatus thereafter serves as a solids storage bin for the extrusion machines until the next polymer manufacturing cycle is completed.

It is often desirable to provide clean-out facilities for the extreme lower portion of the blending apparatus, i.e., the space below the level of the intakes of principal solids draw-offs 12 into the periphery of the blending vessel. Clean-out is conveniently effected by providing two or more equiangularly separated clean-out draw-offs 34 with intakes opening into the periphery of cone 11 just above the top of conduit 15. These draw-offs empty into solids flow equalizer 21 and pneumatic conveyor funnel 24 in the same manner as described for extension solids draw-offs 18. Operational experience has shown that the clean-out draw-offs require no valves for prevention of flow except when clean-out is to be preformed and can, in fact, be left free-flowing to the same extent as extension draw-offs 18, whereupon their flows contribute a share to the blending incidental to simply drawing off material in gravity-flow from apparatus of this type and thereafter recombining it. In this connection, exceptionally good blending has been obtained when every multiple of two clean-out draw-offs 34 is designed with a combined cross-sectional area approximately equal to the cross-sectional area of a single principal solids draw-off 12.

It will be understood that the first solids accumulated within extension draw-offs 18, clean-out draw-offs 34, flow equalizer 21 and conveyor funnel 24 is raw product which passes through the main blending vessel without any blending effort exerted thereon. This is usually not objectionable, since this loading "heel" is expended in preliminary purging of subsequent extrusion machines and the like, so that the first production goes to waste in any event. However, where the blender is not employed in prolonged service with one product exclusively, in which case the initial loading waste is cancelled out many times by subsequent blending conducted on each replacement loading of solids to the blending vessel, even this waste can be prevented by providing valves in the product discharge lines 18 and 34, and such a design is detailed in the embodiment shown in FIG. 5.

Referring now to FIGS. 2–4, there is shown a second embodiment of this invention which, in effect, consolidates the extension solids draw-offs within a single construction.

In the example detailed, the solids blender consists of a cylindrical shell 40, typically, 5'-0" inside dia. x 15' high, opening into a cone bottom portion 41, typically, 7'-3" long, drawn to a flanged opening 42 at the lower end, typically, 22" dia. Co-axially mounted within the blender is a screw conveyor 14' mounted within an enclosing tube 44 (typically, 13" inside dia.), which latter terminates at a spacing of, typically, 2' above opening 42, from which point downwards to opening 42 the screw operates in the open. Screw conveyor 14' is power-driven by a motor-speed reducer unit (not shown) mounted on the top of the blender.

The principal gravity-flow solids draw-offs 12' in the design detailed consist of eight 3" inside diameter pipes individually identified by the letters C, D, E, F, G, H, J and K, respectively, in FIG. 3, only F and D of which appear in FIG. 2. The elevations of the inlet ends of the principal draw-offs measured above opening 42 as reference are C, D, E and F, all on the same horizontal level of 4'-3", G at 6'-11", H at 8'-11", J at 10'-11" and K at 12'-11".

The solids return and unloading apparatus of this embodiment consists of the self-contained assembly denoted generally at 46, which can, typically, have a length from flange 47 mating with the flange of opening 42 to flange 48 at the discharge end of 4'-3" overall, and an internal diameter of tubular casing 49 of 21.5". The upper end of assembly 46 is provided with a frusto-conical transition piece 50 (approximately 13" long), proportioned so as to constitute a smooth continuation of the sloped surface of cone bottom 41, piece 50 being welded peripherally at its upper end in secure attachment with casing 49 at the level of flange 47. The lower circular opening of piece 50 is 13" dia. and, attached thereto by welding, is the tubular conduit 15', also of 13" inside diameter x (typically) 3'-2" long, which is thus disposed co-axially with respect to casing 49 and also with respect to the lower material input end of screw conveyor 14'.

As best seen in FIG. 4, the stabilizer bearing assembly is generally similar to that described with respect to FIGS. 1 and 1A, incorporating as it does a spider 20' having four radially disposed spokes 20" welded at the outboard ends to the inside of the casing and provided centrally with a bearing housing 53 disposed co-axially with respect to the lower end of screw conveyor shaft 14'a. The shaft, in this construction, carries a concentric stub shaft extension 14'b integral therewith, the outboard end of which is journaled within bearing 30', sealed off at the top against solids ingress from the interior of tubular conduit 15' by a succession of felt washers 54. Bearing 30' is held in place within the stepped bore of housing 31 by a conventional snap ring 55.

Washers 54 are shielded peripherally from solid particle attrition by a short section of protective sleeve 56 welded to the inside lower flight edge of screw 14', and therefore rotatable therewith, with small radial clearance therebetween and the outside periphery of the end of shaft 14'a and also of housing 53. The bottom end of housing 53 is closed off by a cap 57 screw-attached thereto, to seal off the housing interior against any escape of lubricant from bearing 30' into the product in process.

As will be seen from FIG. 4 especially there is completely open communication from the bottom end of assembly 46 through spider 20' into the top of solids flow equalizer 21', the flow-throttling cone 22' of which is omitted in this view (but shown in FIG. 2). It is sometimes desirable, particularly when the blending apparatus is to be utilized for the processing of different substances, or widely different particle sizes of the same substance, to provide for vertical adjustment of cone 22' axially of housing 21'a, which in this case is of frustoconical shape, instead of cylindrical as in the design of FIG. 1. This is readily accomplished by attaching pull handles 59 to the top of cone 22', the upper ends of which pass through drilled passages in flange 48 and are locked in any preselected vertical position by stop nuts 69 threaded thereon.

Referring particularly to FIG. 3, the annular solids collection space defined by tubular conduit 15' and tubular casing 49 is divided from top to bottom into a plurality (in this case eight) of individual sub-spaces 63 of substantially equal volume by longitudinal partitions 64. Each of these sub-spaces 63 is served by an individual one of the principal gravity-flow solids draw-offs 12', and thus each constitutes the equivalent of the extension solids draw-offs 18 described with reference to FIG. 1. The volumetric spaces between the adjacent partitions 64 defining walls of adjacent sub-spaces 63 are approximately half the volumes of the full-size sub-spaces, and alternate ones of these, denoted 66 in FIG. 3, serve as the equivalents of the clean-out draw-offs 34 of FIG. 1, receiving solids from slots 67 of approximately half the cross-sectional area of principal draw-offs 12' cut through the wall of transition piece 50 into the extreme lower end of the blender cone bottom 41 as extended, all at the same vertical level.

Tubular conduit 15' is provided with a plurality of solids throughput openings 69, each preferably disposed at a vertical level in line with the projected discharge course of solids emptying from the individual principal solids draw-off 12' serving the particular sub-space 63 with which the individual openings communicate. However, if desired the throughput openings can be located at even lower levels, the objective being to reduce the amount of solids hold-up within apparatus 46 necessary to achieve concurrent recycling with product withdrawal. Accordingly, in order to distribute the points of connection of the principal draw-offs 12' and also to avoid overcrowding, draw-offs F and D are connected to discharge 180° apart into tubular casing 49 with centerlines, as extended, intersecting conduit 15' on line X. Similarly, draw-offs E, G, H and J discharge at irregular angular spacings apart (see FIG. 3) with center lines, as extended, intersecting conduit 15' in the common horizontal plane denoted Y, and, finally, the remaining draw-offs K and C discharge 135° apart with center lines, as extended, intersecting conduit 15' in the common horizontal plane denoted Z.

To accommodate simultaneous solids withdrawal as product with recycle for improvement of blending quality, it is preferred to design the apparatus so that the cross-sectional areas of sub-spaces 63 exceed the cross-sectional areas of principal solids draw-offs 12'. Also, for best balance of recycle in the sense of returning to the blender near-equal volumes of solids discharged by each principal draw-off 12', it is preferred to distribute solids throughput openings 69 circumferentially of tubular conduit 15' and in overlapping progression lengthwise thereof, and also to increase the pitch of screw conveyor 14' stagewise from its lower material input end upwardly (not represented in the drawings), so that the screw pick-up capacity is increased at each of the several associated solids return levels counting from flange 48 upwards.

With some designs incorporating a large number of principal solids draw-offs 12', conditions can be so crowded adjacent to apparatus 46 as to necessitate manifolding of several draw-offs before they discharge into sub-spaces 63, and this can be done without penalty. In this case, the discharge pipe following the manifold connection should be enlarged to approximately the sum of the cross-sectional areas of the draw-offs 12' led thereto. Also, the particular sub-space 63 served by such a manifolded discharge should be made correspondingly larger than its companions.

Product withdrawal for the apparatus of FIGS. 2–4 is, in general, similar to that of FIG. 1, except that no separate funnel 24 is required here, the lower end of solids flow equalizer 21' being simply offset and connected in open communication with pipe 25' through a mating offset nipple 70 secured thereto and cut away to present a side opening 25'a. Product delivery to the using apparatus is again by solids entrainment via line 27'. The operation of the embodiments of FIGS. 2–4, inclusive, is in all respects the same as that of the embodiment of FIGS. 1 and 1A, and thus is not repeated.

FIG. 5 shows a modification of solids return and unloading apparatus identical with the embodiment of FIGS. 2–4, inclusive, except that it incorporates flow control valves 73 at the discharge end of the apparatus. Thus, there is provided an imperforate annular plate 74 attached to the outside of bearing housing 53', each sub-space being fitted with an individual flow control valve 73 of arcuate end profile, so as to be self-scouring in the course of rotational sweep to closed position adjacent the outside periphery of plate 74. Valves 73 are preferably ganged for simultaneous operation, so that the solids output from all sub-spaces 63 is controlled equally in a single adjustment setting by the operator.

Because the lower end of tubular casing 49' is preferably enlarged radially to accommodate the journaled supports 73a of valves 73 outside of the direct line of solids withdrawal from the apparatus, it is more convenient to adjust the frusto-conical equalizer baffle 22" vertically by means of threaded support struts 75 engaging the baffle from the underside. Vertical adjustment is accomplished by simply advancing or retracting the struts past interiorly threaded nut members 76 welded to the outside of the flow equalized housing 21".

It is preferred to terminate tubular conduit 15" a short distance above the lower material input end of the screw conveyor in order to provide a peripheral terminal opening 77 for solids throughput radially of area approximately equal to 0.25 to 1.0 times the average cross-sectional area of a single solids throughput opening 69'. Thus, when the blender is filled with solids initially, valves 73 can be adjusted to their positions shown in FIG. 5, so that no solids pass to flow equalizer 21" and enough recycling can then be accomplished so that a uniform blend of all of the solids is obtained at the very outset. It will be seen that there exists no dead volume of solids, even at the bottom end of apparatus 46', since the valve faces are steeply sloped to direct the solids inwards radially and these solids pass through the terminal opening 77 and are recycled immediately. Then, after an appropriate number of blender content turnovers, valves 73 are opened and operation thereafter proceeds exactly as hereinbefore described for the other embodiments.

It will be understood that, with all of the designs which have been described, the blending vessels can be cleared of their entire contents by simply continuing product withdrawal until no more solids emerge. In this connection, even the solids occupying the flight spaces of the screw conveyors clear radially of the conveyors by ejection in reverse direction through openings 69 (or 69'), or by escape via the open lower end of tubular conduit 15, 15' or 15". This can be facilitated in the design of FIG. 5 by providing a flinger blade 78 integral with the conveyor shaft 14"a and disposed just above plate 74, which is rotated a few times by brief operation of the screw conveyor, whereupon the upper surface of plate 74 is swept clean of solids as a final cleanout step.

From the foregoing, it will be understood that this invention is capable of extensive modification within the skill of the art without departure from its essential spirit, and it is accordingly intended to be limited only by the scope of the appended claims.

What is claimed is:

1. A solids return and unloading apparatus for a solids blender having a vessel for the retention of solids to be blended, a co-axially disposed screw conveyor for solids recycle and a plurality of principal gravity-flow solids draw-offs opening into the periphery of said vessel proportioned to deliver substantially equal volumes of solids to be blended from said vessel during a given interval of time comprising, in combination, a tubular conduit enclosing the lower material input end of said screw conveyor at close clearance and defining therewith a receiver for solids to be recycled, solids throughput openings cut through the wall of said tubular conduit in open communication with individual ones of the lower ends of said principal gravity-flow solids draw-offs, individual extension gravity-flow solids draw-offs connected in open communication with said lower ends of said principal gravity-flow solids draw-offs disposed substantially co-parallel with the axis of said conveyor screw, and solids discharge means in open communication with the lower ends of said extension gravity-flow solids draw-offs.

2. A solids return and unloading apparatus for a solids blender according to claim 1 wherein said individual extension gravity-flow solids draw-offs constitute sub-spaces defined by longitudinal partitions disposed radially of said conveyor screw between the outside periphery of said tubular conduit and the inside periphery of a tubular casing of greater diameter than said tubular conduit disposed substantially co-axially with respect to said tubular conduit so as to define therewith an annular solids collection space.

3. A solids return and unloading apparatus for a solids blender according to claim 2 wherein the horizontal cross-sectional areas of said sub-spaces exceed the cross-sectional areas of said individual ones of said principal solids draw-offs serving said individual sub-spaces.

4. A solids return and unloading apparatus for a solids blender according to claim 1 wherein said solids discharge means in open communication with the lower ends of said sub-spaces is provided with solids flow control means and said tubular conduit is terminated a distance above said lower material input end of said screw conveyor so as to provide a peripheral terminal opening for solids throughput radially of said lower material input end of said screw conveyor of approximately 0.25 to 1.0 times the average cross-sectional area of said solids throughput openings.

5. A solids return and unloading apparatus for a solids blender according to claim 1 wherein said solids throughput openings are distributed circumferentially of said tubular conduit and in overlapping progression lengthwise thereof and said screw conveyor is increased in pitch stagewise from said lower material input end upwardly to effect substantially equal throughput of solids per unit time via all said solids throughput openings into said receiver for solids to be recycled.

6. A solids return and unloading apparatus for a solids blender having a vessel for the retention of solids to be blended, a co-axially disposed screw conveyor for solids recycle and a plurality of principal gravity-flow solids draw-offs opening into the periphery of said vessel proportioned to deliver substantially equal volumes of solids to be blended from said vessel during a given interval of time comprising, in combination, a tubular conduit enclosing the lower material input end of said screw conveyor at close clearance and defining therewith a receiver for solids to be recycled, a tubular casing co-axially mounted with respect to said tubular conduit and defining therewith an annular solids collection space, longitudinal partitions dividing said annular solids collection space into individual sub-spaces each served by an individual one of said principal gravity-flow solids draw-offs, solids throughput openings cut through the wall of said tubular conduit and establishing open communication with said sub-spaces, said principal gravity-flow solids draw-offs having their outlets opening into said sub-spaces at vertical levels with respect to said solids throughput openings permitting passage of solids from said principal gravity-flow solids draw-offs through said openings, and solids discharge means in open communication with the lower ends of said sub-spaces.

References Cited by the Examiner

UNITED STATES PATENTS

| | | | |
|---|---|---|---|
| 3,106,385 | 10/1963 | Arthur et al. | 259—180 |
| 3,138,369 | 6/1964 | Bennett et al. | 259—95 |
| 3,143,336 | 8/1964 | Byberg | 259—97 |
| 3,145,975 | 8/1964 | Towns | 259—95 |
| 3,158,362 | 11/1964 | Seifarth | 259—95 |
| 3,216,629 | 11/1965 | Goins | 259—180 |

WALTER A. SCHEEL, *Primary Examiner.*